(12) United States Patent
Parker

(10) Patent No.: US 11,872,105 B1
(45) Date of Patent: Jan. 16, 2024

(54) DENTAL IMPLANT DEVICE FOR REGENERATION OF DENTAL PULP AND DENTIN

(71) Applicant: Robert Parker, Coos Bay, OR (US)

(72) Inventor: Robert Parker, Coos Bay, OR (US)

( * ) Notice: Subject to any disclaimer, the term of this patent is extended or adjusted under 35 U.S.C. 154(b) by 0 days.

(21) Appl. No.: 18/210,537

(22) Filed: Jun. 15, 2023

Related U.S. Application Data

(60) Provisional application No. 63/429,470, filed on Dec. 1, 2022.

(51) Int. Cl.
*A61C 8/00* (2006.01)
*A61C 8/02* (2006.01)

(52) U.S. Cl.
CPC .......... *A61C 8/0036* (2013.01); *A61C 8/0006* (2013.01); *A61C 2008/0046* (2013.01)

(58) Field of Classification Search
CPC ................ A61C 8/0036; A61C 8/0006; A61C 2008/0046
USPC ........................................................ 433/175
See application file for complete search history.

(56) References Cited

U.S. PATENT DOCUMENTS

| | | | |
|---|---|---|---|
| 3,069,773 A | 12/1962 | Saffir | |
| 3,413,723 A | 12/1968 | Degussa | |
| 4,187,608 A * | 2/1980 | Nyce | A61C 8/0036 433/201.1 |
| 4,321,042 A * | 3/1982 | Scheicher | C04B 35/80 106/35 |
| 5,372,503 A | 12/1994 | Elia | |
| 5,573,401 A | 11/1996 | Davidson et al. | |
| 6,299,448 B1 * | 10/2001 | Zdrahala | A61C 8/0036 433/175 |
| 7,708,557 B2 | 5/2010 | Rubbert | |
| 8,231,387 B2 | 7/2012 | Salvi | |

(Continued)

FOREIGN PATENT DOCUMENTS

| | | |
|---|---|---|
| CA | 1113970 A | 12/1981 |
| CA | 1117255 A | 2/1982 |

(Continued)

OTHER PUBLICATIONS

David T. Wu, Polymeric Scaffolds for Dental, Oral, and Craniofacial Regenerative Medicine, Molecules 2021, 26, 7043. https://doi.org/10.3390/molecules26227043.

(Continued)

*Primary Examiner* — Matthew M Nelson
(74) *Attorney, Agent, or Firm* — Jafari Law Group, Inc.

(57) ABSTRACT

The present invention is a dental implant device that mimics the structure and appearance of a real tooth. In some exemplary embodiments, the implant device may include a top portion, a bottom portion, and a cavity. The top portion is a crown portion adapted to mimic a crown of a real tooth. The bottom portion includes a root portion that is adapted to facilitate blood flow into the device. The cavity is adapted to receive and retain blood flow, which triggers the regeneration of dental pulp and dentin and makes the device vital. The dental pulp will contain real nerve roots which not only enable the artificial tooth to sense hot and cold, but also give the tooth vitality. The device is implanted into a patient's gum line and will gain strength in approximately 1½ months and be at full strength within 3 months.

20 Claims, 3 Drawing Sheets

(56) References Cited

U.S. PATENT DOCUMENTS

| | | | |
|---|---|---|---|
| 8,287,279 B2 * | 10/2012 | Pirker | A61C 8/0036 433/175 |
| 8,628,325 B2 | 1/2014 | Vachtenberg | |
| 8,684,734 B1 * | 4/2014 | Lyren | A61C 8/0024 433/173 |
| 9,351,813 B1 * | 5/2016 | Lyren | A61C 8/0018 |
| 9,566,135 B2 * | 2/2017 | Elia | A61K 35/44 |
| 9,707,321 B2 * | 7/2017 | Daigo | A61L 27/06 |
| 9,763,752 B2 * | 9/2017 | Dosta | A61C 8/0022 |
| 2006/0127437 A1 | 6/2006 | Kennedy | |
| 2009/0148486 A1 | 6/2009 | Lu | |
| 2010/0015200 A1 | 1/2010 | McClain et al. | |
| 2010/0015576 A1 | 1/2010 | Altshuler et al. | |
| 2010/0145393 A1 * | 6/2010 | Fallin | A61B 17/866 606/301 |
| 2011/0200969 A1 * | 8/2011 | Schroering | A61C 8/005 433/174 |
| 2011/0280924 A1 | 11/2011 | Lin | |
| 2013/0310948 A1 * | 11/2013 | Luscher | A61B 17/68 427/2.24 |
| 2014/0030675 A1 * | 1/2014 | Sanchez | A61C 8/0012 433/174 |
| 2014/0200678 A1 | 7/2014 | Detamore | |
| 2014/0335472 A1 * | 11/2014 | Dosta | A61C 8/0012 428/221 |
| 2015/0320521 A1 * | 11/2015 | Battula | A61C 8/0068 433/173 |
| 2017/0042644 A1 * | 2/2017 | Tamai | A61L 27/047 |
| 2017/0156824 A1 | 6/2017 | Rubbert et al. | |
| 2018/0028284 A1 * | 2/2018 | Thomke | A61C 8/0036 |
| 2018/0177596 A1 * | 6/2018 | Huang | A61B 17/863 |
| 2019/0001025 A1 | 1/2019 | Ferrari et al. | |
| 2019/0290402 A1 * | 9/2019 | Djemai | A61K 6/822 |
| 2020/0275998 A1 * | 9/2020 | Lomicka | A61K 6/84 |
| 2021/0068931 A1 * | 3/2021 | Thomke | A61C 8/0021 |
| 2022/0151740 A1 * | 5/2022 | Ruetze | A61K 38/18 |

FOREIGN PATENT DOCUMENTS

| | | | |
|---|---|---|---|
| CN | 1997421 | A | 7/2007 |
| CN | 105662621 | A | 6/2016 |
| CN | 103892930 | B | 4/2017 |
| CN | 106901852 | A | 6/2017 |
| CN | 107536651 | A | 1/2018 |
| CN | 107997838 | A | 5/2018 |
| CN | 108114322 | A | 6/2018 |
| CN | 108553187 | A | 9/2018 |
| CN | 105662621 | B | 10/2018 |
| CN | 208823014 | A | 5/2019 |
| CN | 208958366 | U | 6/2019 |
| CN | 106178124 | B | 10/2019 |
| CN | 110403721 | B | 8/2021 |
| DE | 19957857 | A1 | 11/2000 |
| ES | 2284236 | T3 | 11/2007 |
| JP | 04141163 | A | 5/1992 |
| JP | 4061581 | B2 | 3/2008 |
| KR | 100279178 | B1 | 1/2001 |
| KR | 20150114710 | A | 10/2015 |
| KR | 20210044168 | A | 4/2021 |
| RU | 2023437 | C1 | 11/1994 |
| WO | 1998047439 | A2 | 10/1998 |
| WO | 2003082188 | A2 | 10/2003 |
| WO | 2005046746 | A2 | 5/2005 |
| WO | 2006090777 | A1 | 8/2006 |
| WO | WO-2010139041 A1 * | 12/2010 | ........... A61C 8/0012 |
| WO | 2015167050 | A1 | 11/2015 |
| WO | 2019104852 | A1 | 6/2019 |
| WO | 2019223753 | A1 | 11/2019 |
| WO | 2019240478 | A1 | 12/2019 |

OTHER PUBLICATIONS

Dental Porcelain, Comprehensive Biomaterials II, 2017.

* cited by examiner

DENTAL IMPLANT DEVICE FOR REGENERATION OF DENTAL PULP AND DENTIN

PRIORITY CLAIM

The present application claims priority to U.S. Provisional Patent Application with Ser. No. 63/429,470, filed on Dec. 1, 2022, the disclosure of which is incorporated herein by reference in its entirety.

TECHNICAL FIELD OF THE INVENTION

The present disclosure relates generally to an implant device, and more particularly, to a dental implant device.

BACKGROUND OF THE INVENTION

Generally, a dental implant device includes a dental implant and a prosthetic device that is directly or indirectly anchored to the dental implant. An artificial tooth is an example that includes a dental implant of a complete artificial tooth from crown top to root bottom which is surgically implanted into a patient's gum line.

One problem with existing dental implants is the unattractive colors of the device. Traditionally, metals like commercially pure titanium and titanium alloys are used for making dental implants and implant components, such as abutments, etc., due to their excellent material stability and good biological integration. However, the implant or abutment that is visible near the gingival margin provides a non-aesthetic appearance to a person's mouth.

Another problem with existing dental implants is they are implanted into the jawbone and not the gum line.

Yet another problem with the existing dental implants is loosening of the implant. The implant fixed to the bone often does not bond with the bone, which causes loosening of the implant. The loosening of the implant may also be caused by the poor distribution of forces from the implant to the maxilla or mandible. If the load is concentrated on a particular portion of the maxilla or mandible, this stress concentration may cause the bond between the implant and maxilla or mandible to weaken. Stress concentrations are typically caused by improper implant design or positioning, or an implant that is not shaped to distribute the tooth load relatively evenly.

Therefore, there is a need for an improved, dental implant device that could alleviate one or more discussed problems with the existing dental implant device.

BRIEF SUMMARY OF THE INVENTION

The present invention discloses a dental implant device.

In some exemplary embodiments, the implant device may include: a top portion that is a crown portion, wherein the crown portion is adapted to mimic a crown of a real tooth; a bottom portion comprising of a root portion, wherein the root portion is adapted to facilitate blood flow into the implant device; and a cavity adapted to receive blood flow and make the implant device vital.

In some exemplary embodiments, the crown portion includes a plurality of contours that mimics the contours of the crown of the real tooth.

In some exemplary embodiments, the root portion includes a porous portion.

In some exemplary embodiments, the porous portion includes a plurality of microscopic pores.

In some exemplary embodiments, the porous portion is adapted to facilitate blood flow through the microscopic pores. The microscopic pores ensure increased capillary pressure and nourish the tissues at the implant site.

In some exemplary embodiments, the porous portion includes an arrangement of pores that allows blood flow in any direction, which increases the adhesive strength of the tissue with the dental implant device.

In some exemplary embodiments, the porous portion is further adapted to have a porosity and pore sizes that mimic those of a real tooth.

In some exemplary embodiments, the porous portion is further adapted to facilitate blood flow into the cavity.

In some exemplary embodiments, the porous portion is adapted to facilitate the flow of blood, which intensifies the nourishing of the growing tissue and reduces the likelihood of a recession.

In some exemplary embodiments, the cavity is adapted to receive the blood flow from the porous portion.

In some exemplary embodiments, the cavity is further adapted to facilitate the creation of real vital nerve roots with the blood flow from the porous portion.

In some exemplary embodiments, the cavity is adapted to facilitate the creation of dental pulp and dentin with the blood flow from the porous portion.

In some exemplary embodiments, the cavity is further adapted to house the dental pulp that makes the implant device vital.

In some exemplary embodiments, the implant device is adapted to be implanted into an implant site of a patient's gum line.

In some exemplary embodiments, the bottom portion is adapted to attach at the implant site.

In some exemplary embodiments, the implant device is adapted to attach to a plurality of gingival fibers of gingival fibers of the patient that run perpendicularly to a longitudinal axis of the implant device.

In some exemplary embodiments, the bottom portion is adapted to anchor to a user's jaw by attaching to a user's periodontal ligaments.

In some exemplary embodiments, the dental implant device is temporarily secured at the implant site with stitches or an oral adhesive bandage.

In some exemplary embodiments, the implant device consists of a biocompatible material.

In some exemplary embodiments, the implant device is made of water-proof polished porcelain.

In some exemplary embodiments, the dental implant device is formed as a single integral body that is made to be implanted as a single unit.

In some exemplary embodiments, the blood flow through the porous portion into the cavity triggers the body to form new nerve roots, blood vessels, and other specialized cells and connective tissues within the cavity. These regenerated components form a new dental pulp and dentin that fills the once hollow cavity and gives the dental implant its vitality.

BRIEF DESCRIPTION OF DRAWINGS

Elements in the figures have not necessarily been drawn to scale in order to enhance their clarity and improve understanding of these various elements and embodiments of the present invention. Furthermore, elements that are known to be common and well understood to those in the industry are not depicted in order to provide a clear view of the various embodiments of the invention.

DETAILED DESCRIPTION OF THE INVENTION

Figure 1:
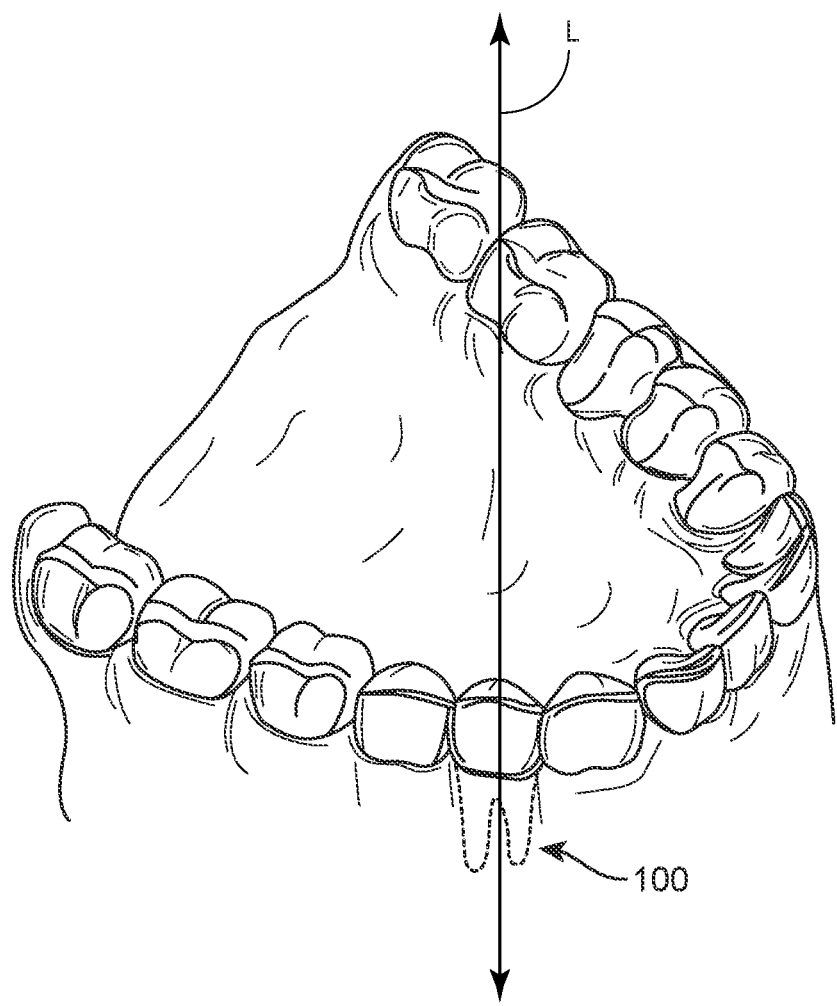
FIG. 1 illustrates a perspective view of a human jaw implanted with a dental implant device.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

As used in this disclosure, the term "comprise" and variations of the term, such as "comprising" and "comprises", are not intended to exclude other additives, components, integers or steps. For purpose of description herein, the terms "upper", "lower", "left", "right", "front", "rear", "horizontal", "vertical" and derivatives thereof shall relate to the invention as oriented in figures. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristic relating to the embodiments disclosed herein are not to be considered as limiting, unless the claims expressly state otherwise.

Turning now to the figures, FIG. 1 illustrates a dental implant device embedded in a tooth socket of a patient's mouth. More specifically, FIG. 1 illustrates an exemplary implantation of the dental implant device 100 achieving stability and vitality within the patient's jaw line. In some exemplary embodiments, the implant device 100 is adapted to be implanted into an implant site of a patient's gum line. In some exemplary embodiments, the implant device 100 is adapted to attach to a plurality of gingival fibers of the patient that run perpendicularly to a longitudinal axis L of the implant device 100. In some exemplary embodiments, the implant device 100 is adapted to anchor to a user's jaw line by attaching to a user's periodontal ligaments.

Figure 2:
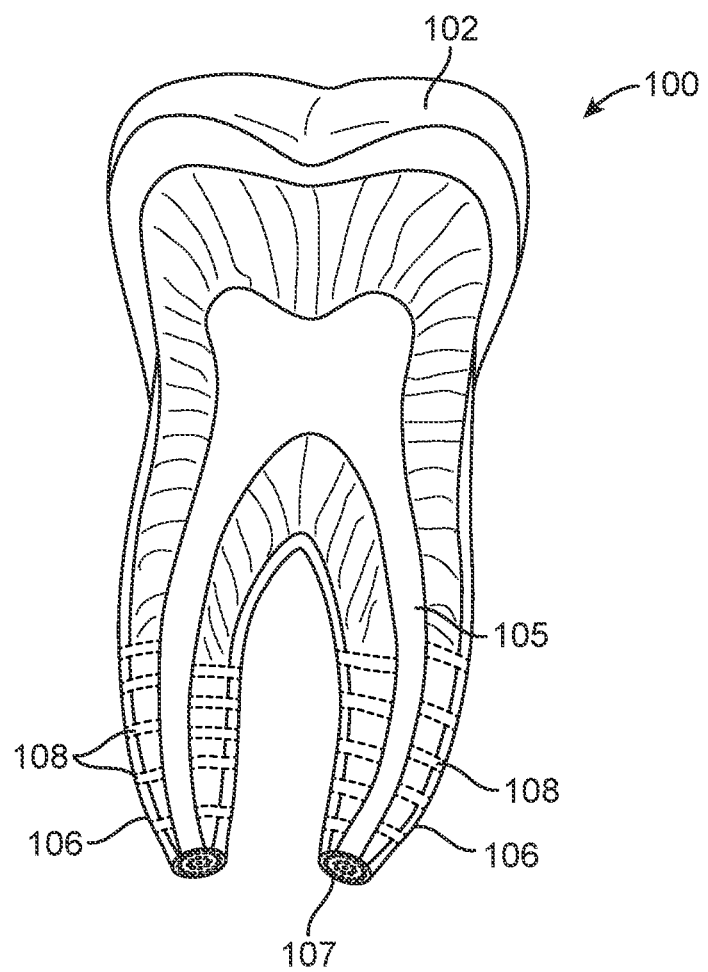
FIG. 2 is a sectional view of a dental implant device in accordance with some exemplary embodiments of the present invention.

Turning now to the next figure, FIG. 2 is a sectional view of a dental implant device 100 in accordance with some exemplary embodiments of the present invention. From the sectional view, it can be appreciated that the cavity 105 of the implant device 100 is adapted to receive and retain blood flow from the porous portion 106 of the implant device 100.

The bottom portion 103 includes a porous portion 106. In some exemplary embodiments, the porous portion 106 includes an arrangement of microscopic pores 104 that allows blood flow in any direction. For example, the arrangement of microscopic pores 104 of the porous portion 106 may provide blood flow through the apex 107 and lateral canals 108 of the implant device 100.

In some embodiments, the cavity 105 is adapted to facilitate the regeneration of the patient's dental pulp and dentin, which gives the implant device 100 its vitality. It is proposed and hypothesized that when the blood flows into the cavity 105 of the implant device 100 and the blood coagulates, the body of the patient forms new nerve roots, capillaries, and other specialized cells and connective tissue that become the dental pulp and dentin within the cavity 105 of the implant device 100 to give the implant device 100 vitality.

Figure 3:
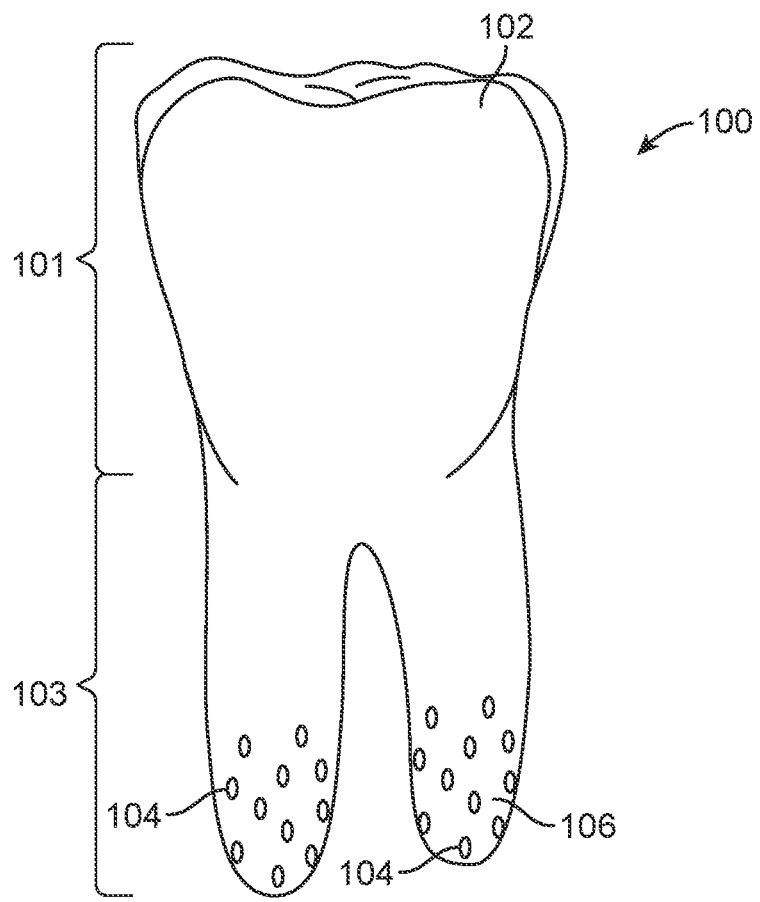
FIG. 3 illustrates a perspective view of a dental implant device in accordance with some exemplary embodiments of the present invention.

Turning now to the next figure, FIG. 3 is a perspective view of the dental implant device 100 in accordance with some exemplary embodiments of the present invention. From the perspective view, it can be appreciated that the dental implant device 100 is constructed to mimic the structure and appearance of the patient's real tooth or teeth and can even be used to implant in persons with dentures.

In some exemplary embodiments, the top portion 101 is a crown portion 102, wherein the crown portion 102 is adapted to mimic a crown of a real tooth. In some exemplary embodiments, the top portion 101 of the implant device 100 has different contours. Preferably, the contours of the implant device 100 vary depending upon the type of tooth and the tooth location along the mandible or maxilla.

In some exemplary embodiments, the bottom portion 103 includes a porous portion 106. In some exemplary embodiments, the porous portion 106 includes a plurality of microscopic pores 104 that mimic the pore size and porosity of the real tooth it is replacing; or a missing real tooth it is replacing. For example, the pores 104 may vary in diameter depending on their location in the porous portion 106 of the implant device 100, however, their size are very small to microscopic.

A dental implant device has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. An implant device comprising:
    a top portion that is a crown portion consisting of a biocompatible material, wherein the crown portion is adapted to mimic a crown of a real tooth;
    a bottom portion consisting of the biocompatible material and comprising of a root portion, wherein the root portion includes a porous portion adapted to facilitate blood flow into the implant device; and
    a cavity, defined inside the top portion and the bottom portion, adapted to receive and retain the blood flow;
    wherein the top portion and the bottom portion form a single integral body.

2. The implant device of claim 1, wherein the crown portion includes a plurality of contours that mimic contours of the crown of the real tooth.

3. The implant device of claim 1, wherein the porous portion includes a plurality of microscopic pores.

4. The implant device of claim 3, wherein the porous portion is adapted to facilitate the blood flow through the plurality of microscopic pores.

5. The implant device of claim 1, wherein the porous portion includes an arrangement of pores that allows the blood flow in any direction.

6. The implant device of claim 1, wherein the porous portion is further adapted to have a porosity and pore sizes that mimic those of a real tooth.

7. The implant device of claim 1, wherein the porous portion is further adapted to facilitate the blood flow into the cavity.

8. The implant device of claim 1, wherein the cavity is adapted to receive the blood flow from the porous portion.

9. The implant device of claim 1, wherein the cavity is further adapted to facilitate the creation of real vital nerve roots with the blood flow from the porous portion.

10. The implant device of claim 1, wherein the cavity is further adapted to facilitate the creation of a dental pulp with the blood flow from the porous portion.

11. The implant device of claim 1, wherein the cavity is further adapted to house the dental pulp and dentin that makes the implant device vital.

12. The implant device of claim 1 is adapted to be implanted into an implant site of a patient's gum line.

13. The implant device of claim 12, wherein the bottom portion is adapted to attach at the implant site.

14. The implant device of claim 12, wherein a longitudinal axis of the bottom portion of the implant device is adapted to run perpendicular to a plurality of a user's gingival fibers.

15. The implant device of claim 1, wherein the bottom portion is adapted to anchor to a user's jaw by attaching to the user's periodontal ligaments.

16. The implant device of claim 1, wherein the porous portion includes apices and lateral canals, the apices and the lateral canals adapted to facilitate the blood flow into the cavity.

17. An implant device comprising:
    a top portion that is a crown portion consisting of a biocompatible material, wherein the crown portion is adapted to mimic a crown of a real tooth and includes a plurality of contours that mimic contours of the crown of the real tooth;
    a bottom portion consisting of the biocompatible material and comprising of a root portion, wherein the root portion is adapted to facilitate blood flow into the implant device; and
    a cavity, defined inside the top portion and the bottom portion, adapted to receive and retain blood flow;
    wherein the top portion and the bottom portion form a single integral body.

18. The implant device of claim 17, wherein:
    the root portion includes a porous portion comprising an arrangement of a plurality of microscopic pores that facilitates the blood flow in any direction; and
    the plurality of microscopic pores mimics the porosity and pore size of a real tooth.

19. The implant device of claim 18, wherein the cavity is adapted to receive and retain the blood flow from the porous portion.

20. The implant device of claim 17 is adapted to be implanted into an implant site of a patient's gum line by attaching to a plurality of gingival fibers of the patient that run perpendicularly to a longitudinal axis of the implant device, wherein the bottom portion is adapted to attach at the implant site and anchor to a user's jaw by attaching to the user's periodontal ligaments.

\* \* \* \* \*